May 22, 1945.   A. L. DI LIETO   2,376,670
RECEPTACLE AND RACK
Filed May 19, 1943
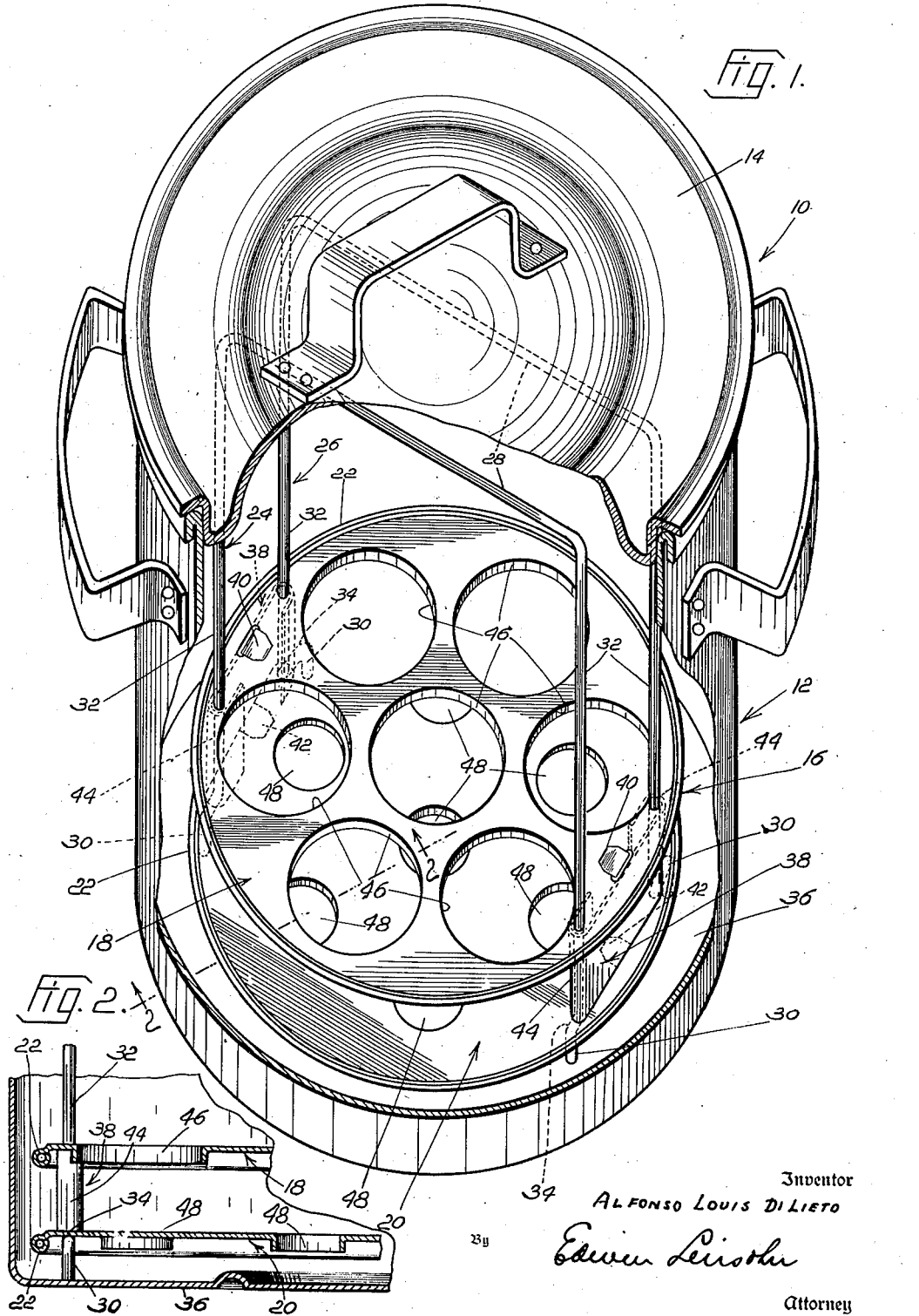
Inventor
ALFONSO LOUIS DI LIETO
Attorney Patented May 22, 1945

2,376,670

UNITED STATES PATENT OFFICE 2,376,670

RECEPTACLE AND RACK

Alfonso Louis Di Lieto, Ozone Park, N. Y., assignor to A. Kreamer, Inc., Brooklyn, N. Y., a corporation of New York Application May 19, 1943, Serial No. 487,595

5 Claims. (Cl. 211—74)

This invention relates to means intended primarily for use in canning or preserving foods.

One object of the invention is the provision of a device which is well adapted to facilitate the heating of cans, jars or other containers of food in connection with preserving the foods in said containers.

Another object of the invention is to provide means to facilitate the insertion and removal of the containers of foods in and from the heating receptacle.

A further object is the provision of means of the above described character which is especially well adapted for use in the home.

A yet further object of the invention is generally to provide improved means of the character described.

The above and other objects, features and advantages of the present invention will be fully understood from the following description, reference being had to the accompanying illustrative drawing.

In the drawing:

Fig. 1 is a perspective view of the means embodying the present invention, part of the heating receptacle being broken away for the purpose of illustration;

Fig. 2 is a fragmentary vertical sectional view on the line 2—2 of Fig. 1.

For convenience in reference the means of the present invention will be referred to as a canner, which is its commercial name. As illustrated in the drawing, this canner, indicated generally by the reference numeral 10, is preferably formed of metal, but can, of course, be formed of any other suitable material and comprises a heating receptacle 12 provided with a removable cover 14, and a rack 16 which fits within said receptacle, being insertable in and removable therefrom through the top of the receptacle when the cover 14 is removed.

Referring now more particularly to the rack 16, as shown in the drawing, said rack comprises an upper plate 18 and a lower plate 20, each preferably formed of sheet metal and provided with a peripheral continuous beaded edge 22. The pair of plates 18 and 20 are disposed in vertical spaced relation and are secured in said relation to a pair of laterally spaced U-shaped members 24 and 26, the upper horizontal portions 28 of said members serving as handles for the rack. The lower end portion 30 of each vertical part 32 of each of said U-shaped members is offset laterally providing the lower ends of each of said U-shaped members with shoulders 34. The lower plate 20 is seated on said shoulders 34 and is thereby supported and held in position above the bottom 36 of receptacle 12 when the rack is mounted therein. The upper plate 18 is supported on the vertical spacing members 38 which are disposed between and engage the upper surface of lower plate 20 and the lower surface of upper plate 18. Said members 38 are of the same construction and are each provided with upper and lower tongues 40 and 42, respectively, which project through companion slits in the companion plates and are bent respectively over the upper surface of plate 18 and the lower surface of plate 20. Also, as here shown, the end portions 44 of the spacing members are bent around the vertical parts 32 of the U-shaped members 24 and 26. It will be noted that the vertical parts 32 of said U-shaped members pass through aligned holes in plates 18 and 20, it being understood that end portions 30 of said U-shaped members are offset after said plates are assembled with said U-shaped members.

Plate 18 is provided with circular or other suitable shaped openings 46 in which the jars, cans, or other containers of food to be preserved are received for supporting the latter on the upper surface of lower plate 20, the edges of said openings constituting means to position said containers of food in the rack and to prevent them from moving laterally off the rack. Plate 20 is provided with a plurality of openings 48 which are preferably smaller than openings 46 and which are offset laterally of the openings 46 in the upper plate 20 to permit proper circulation of the hot water in receptacle 12. In this connection it will be understood that when the jars or other containers of food are inserted through openings 46 of the upper plate and are supported on the lower plate 20, the bottoms of said containers will not completely cover openings 48 of plate 20. Further it will be understood that the jars or other containers which are mounted in the rack will ordinarily be long enough to project above the upper surface of upper plate 18 when said containers are supported on plate 20.

While I have shown and described the preferred embodiment of my invention, it will be understood that the latter may be embodied otherwise than as herein shown or described and that in the illustrated embodiment certain changes in the details of construction and in the arrangement of parts may be made. Also it will be understood that while the invention is intended primarily for use in connection with the preserving of foods, the means embodying this invention may be used for other purposes. Accordingly, I do not wish to be limited to the use or to the construction herein specifically illustrated or described except to the extent which may be required by the scope of the appended claims.

Having thus described my invention, what I claim and desire to secure by Letters Patent is:

1. Means of the character described comprising a rack, said rack comprising a pair of vertically spaced plates, two pairs of laterally spaced vertical members passing through said plates and holding them in vertical alignment, and means positioned between said plates for holding them in said vertically spaced relation, said last mentioned means comprising spacing members each having upper and lower portions secured to said upper and lower plates, respectively, and end portions bent around the laterally spaced vertical members of one of said pairs of members.

2. Means of the character described comprising a rack, said rack comprising a pair of vertically spaced plates, means passing through said plates and holding them in vertical alignment, and means positioned between said plates for holding them in said vertically spaced relation, said last mentioned means comprising spaced members positioned between said two plates and having upper and lower edges in engagement with the confronting surfaces, respectively, of said plate, said plates having aligned openings therein and each of said spacing members having tongues projecting from said upper and lower edges, respectively, thereof extending through the openings in the adjacent plates, respectively, and bent over the upper and lower surfaces, respectively, of said upper and lower plates.

3. Means of the character described comprising a rack including a lower article-supporting plate, an upper plate spaced upwardly from said lower plate and provided with a plurality of openings for positioning the articles mounted on said rack and supported by said lower plate, a plurality of members having longitudinally extending vertical parts passing through said plates and having integral offset end portions below said lower plate providing shoulders which support said lower plate, and means positioned between said upper and lower plates for holding them in spaced relation longitudinally of said vertical parts, said last mentioned means comprising spaced members positioned between said two plates and having upper and lower edges in engagement with the confronting surfaces, respectively, of said plates, said plates having aligned openings therein and each of said spacing members having tongues projecting from said upper and lower edges, respectively, thereof extending through the openings in the adjacent plates, respectively, and bent over the upper and lower surfaces, respectively, of said upper and lower plates.

4. Means of the character described comprising a rack including a lower article-supporting plate, an upper plate spaced upwardly from said lower plate and provided with a plurality of openings for positioning the articles mounted on said rack and supported by said lower plate, means for holding said plates in vertically spaced relation, said last mentioned means comprising spaced members positioned between said two plates and having upper and lower edges in engagement with the confronting surfaces, respectively, of said plates, said plates having aligned openings therein and each of said spacing members having tongues projecting from said upper and lower edges, respectively, thereof extending through the openings in the adjacent plates, respectively, and bent over the upper and lower surfaces, respectively, of said upper and lower plates, and means for holding said plates in vertical alignment, said last mentioned means comprising a plurality of members each having laterally spaced vertical parts passing through said plates and having offset end portions below said lower plate providing shoulders which support said lower plate, each of said members having an upper transverse portion fixed to and extending between the companion laterally spaced vertical parts above said upper plate, the transverse portions of said members providing handles for the rack.

5. Means of the character described comprising a rack including a lower article-supporting plate, an upper plate spaced upwardly from said lower plate and provided with a plurality of openings for positioning the articles mounted on said rack and supported by said lower plate, means for holding said plates in vertically spaced relation, and means for holding said plates in vertical alignment, said last mentioned means comprising a plurality of inverted U-shaped members each having a pair of laterally spaced vertical parts passing through said plates and having their lower end portions secured to said lower plate in supporting relation thereto, the upper transverse portions of said U-shaped members providing handles for the rack, said means for holding said plates in spaced relation comprising spacing members positioned between said two plates and having upper and lower edges in engagement with the confronting surfaces, respectively, of said plates, and end portions secured to said laterally spaced parts of said U-shaped members.

ALFONSO LOUIS DI LIETO.